United States Patent [19]

Sadeh

[11] Patent Number: 4,593,359

[45] Date of Patent: Jun. 3, 1986

[54] VEHICLE NAVIGATION SYSTEM

[76] Inventor: Ilan Sadeh, 13 Herzog St., Tel-Aviv, Israel

[21] Appl. No.: 507,571

[22] Filed: Jun. 24, 1983

[51] Int. Cl.$^4$ .............................................. G06F 15/50
[52] U.S. Cl. .................................... 364/443; 364/449; 364/571; 33/356
[58] Field of Search ............... 364/424, 443, 444, 449, 364/457, 559, 571, 577; 324/244, 245; 73/178 R; 33/356, 361

[56] References Cited

U.S. PATENT DOCUMENTS

| | | | |
|---|---|---|---|
| 4,091,543 | 5/1978 | Lapeyre | 33/356 |
| 4,413,424 | 11/1983 | Sasaki et al. | 33/356 |
| 4,414,753 | 11/1983 | Moulin et al. | 33/356 |
| 4,416,067 | 11/1983 | Scherer et al. | 33/356 |
| 4,429,469 | 2/1984 | Tsushima et al. | 33/356 |
| 4,445,279 | 5/1984 | Tsushima et al. | 33/356 |
| 4,497,034 | 1/1985 | Kuno et al. | 364/444 |

Primary Examiner—Gary Chin
Attorney, Agent, or Firm—Benjamin J. Barish

[57] ABSTRACT

A vehicle navigation system comprises a magnetic-field sensor mounted on the vehicle and outputting electrical signals corresponding to the measured azimuth of the vehicle, an analog-to-digital converter, and a microcomputer including a storage device having a stored look-up table of correction factors for various azimuth positions of the vehicle and a processor programmed to compute the true azimuth values from the measured values and the stored look-up table. The invention is particularly useful for vehicles, such as tanks, having two relatively movable parts, such as the tank hull and the turret, in which case the system includes two of the magnetic-field sensors, each mounted on one of these parts, and the storage device has stored therein two look-up tables each in the form of a matrix of correction factors for the various azimuth positions of each movable part.

7 Claims, 5 Drawing Figures

WHERE: $\alpha = \frac{\lceil x \rceil - x}{B}$
$\beta = \frac{\lceil y \rceil - y}{B}$

B-RESOLUTION OF QUANTIZATION (100 MILS)

$\lceil \ \rceil$ -UP-ROUNDING
$\lfloor \ \rfloor$ -DOWN ROUNDING

VEHICLE NAVIGATION SYSTEM

BACKGROUND OF THE INVENTION

The present invention relates to vehicle navigation systems, particularly for navigating vehicles having magnetic-field disturbing characteristics inherent in their construction. The invention is especially useful for navigating tanks or other vehicles having two relatively movable parts (e.g., the hull and turret in a tank) which have both individual and mutual magnetic-field disturbing characteristics, depending on their position to the Magnetic North, and to each other; the invention is therefore described below with respect to this application, but it will be appreciated that the invention could advantageously be used in other applications as well.

Generally speaking, the conventional land-navigation systems have been found not to be suitable for navigating tanks or similar vehicles, for a number of reasons. Thus, the conventional inertial-gyro system is unsuitable because of the high price of such systems, the long gyrocompassing process required before navigation, the "drift" characteristics inherent in such systems, the high power consumption, and the difficulty in maintenance. The conventional directional-gyro system updated by a magnetic sensor is unsuitable also because of its high price, the need to pre-stabilize the gyro, and the gyro "drift." The conventional magnetic compass system is unsuitable primarily because of its poor accuracy in a "noisy" environment, which makes it virtually impossible to use in a tank or other armored vehicle.

An object of the present invention is to provide a new navigation system which is particularly useful for vehicles having magnetic-field disturbing characterists inherent in their construction, such as in a tank or other armored vehicle.

BRIEF SUMMARY OF THE INVENTION

According to a broad aspect of the present invention, there is provided such a navigation system comprising a magnetic-field sensor mounted on said vehicle and outputting electrical signals corresponding to the measured azimuth of the vehicle; an analog-to-digital converter for converting said output signals to digital values; and a microcomputer including a storage device having stored therein a look-up table of correction factors for various azimuth positions of the vehicle; input means for inputting the digital values corresponding to the measured azimuth of the vehicle; computer means programmed to compute from the measured values and the stored look-up table the true azimuth values; and output means for outputting the true azimuth values.

The invention is particularly suitable for use with vehicles, such as tanks, having two relatively movable parts having individual and mutual magnetic-field disturbing characteristics; the system including two of the magnetic-field sensors, each mounted on one of the parts of the vehicle, the outputted electrical signals corresponding to the measured azimuth of the two parts being converted to digital values by the analog-to-digital converter; the storage device having stored therein two look-up tables, each in the form of a matrix of correction factors for the various azimuth positions of each relatively movable part of the vehicle.

Two embodiments of the invention are described below. In one embodiment, the correction factors stored in the look-up tables are based on various true azimuth positions of the vehicle (or of each of its relatively movable parts), the computer being programmed to compute, by interpolation of the stored correction factors, the true azimuth values according to an iterative algorithm which converges from the measured azimuth to the true azimuth.

According to a second described embodiment, the correction factors stored in the look-up tables are based on the measured azimuth positions, in which case the computer is programmed to compute the true azimuth values by direct interpolation of the stored correction factors.

Navigation system constructed in accordance with the foregoing features provide a number of important advantages over conventional systems, particularly when used for navigating tanks or other armored vehicles having magnetic-field disturbance characteristics inherent in their construction. Thus, the invention permits the navigation system to be implemented in a relatively simple and inexpensive construction such as to make it practical for tank or other armored vehicles. In addition, the system is available for immediate operation without requiring any precomputing or alignment procedures. Further, there is no "drift" which can produce an accumulation of errors particularly over a long period of time of operation. Still further, the accuracy of the system is and remains inherently high since the navigation is, in effect, self-adaptive and continuously updated for each azimuth position. In addition, there is no interference between the system and the internal parts of the vehicle, so that the maintenance of the system is relatively simple. Still further advantages in such a system are the fact that it is self-contained, and does not require external data; it requires pure electronic circuitry without moving parts, and therefore inherently has high reliability; and, particularly when a two-sensor system is used, e.g., in a tank, it provides redundancy, i.e., if one sensor malfunctions, the system is still operative with the other sensor to provide azimuth data.

According to another preferred feature, the system further includes filter means for removing from the electrical signals outputted by each sensor the higher frequency components, i.e., having a frequency higher than, e.g., about 0.1 Hz. Since the azimuth signals outputted by the sensors are narrow-band signals having a spectral density lower than about 0.1 Hz, this elimination of the higher-frequency components substantially reduces the noise and disturbance effects, thereby further improving reliability and accuracy.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

General Construction

Figure 1:
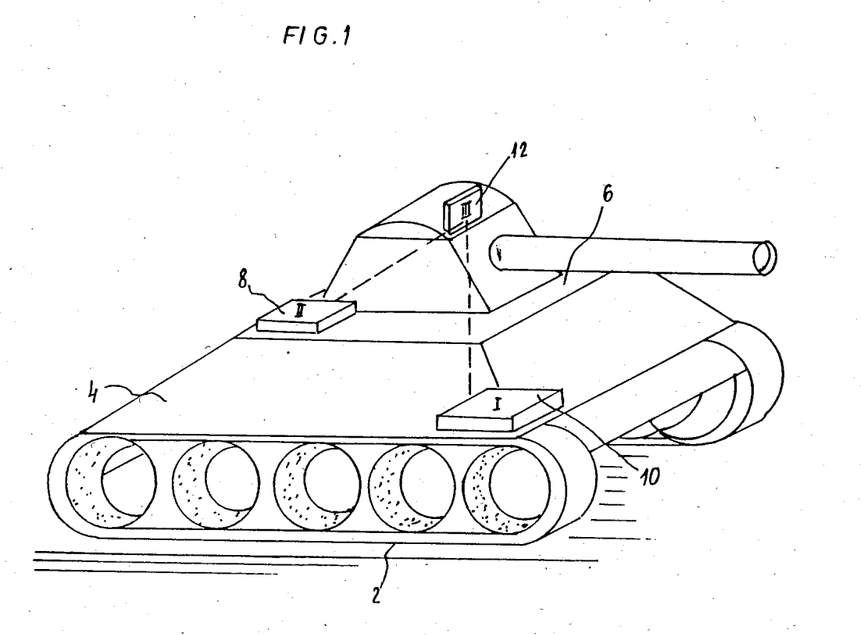
FIG. 1 schematically illustrates, for purposes of example only, a tank equipped with a navigation system constructed in accordance with the present invention.

With reference first to FIG. 1, there is illustrated a tank, generally designated 2, including a hull 4 and a turret 6 relatively movable to each other. As indicated above, such tanks are constructed of heavy metal armor which greatly disturb the natural magnetic field, thereby effectively precluding the use of conventional magnetic compasses for purposes of navigation. Moreover, the problem is made even more difficult in tanks by the fact that the magnetic field disturbances vary not only according to the different positions of the hull and turret with respect to the Magnetic North, but also with respect to each other.

According to the present invention, the hull 4 is provided with a magnetic-field sensor 10 and likewise, the turret 6 is provided with a magnetic-field sensor 8. The tank is further equipped with a control and display unit 12 which includes a microcomputer processing the electrical signals outputted by the two sensors. Preferably, the hull sensor 10 is located on the front upper part of the hull where the magnetic field disturbances are relatively lower, and similarly, the turret sensor is located on the upper part of the turret, relatively high near the position of the commander, where the control and display unit 12 is also located. These units, however, could be located at other places on the tank.

Various types of magnetic sensors may be used for units 8 and 10 in FIG. 1. One preferred type is the "Remote Magnetic Heading Sensor" of Develco, Inc., Model 106120, which sensor produces analog output signals corresponding to the horizontal-magnetic-component which have been compensated for both roll and pitch. However, other types of magnetic sensors may be used, such as Hall-effect sensors, without such compensation, in which case the microcomputer in the control and display unit 12 can be programmed to provide such compensation, together with the other functions to be performed by the microcomputer as will be described more particularly below.

Figure 2:
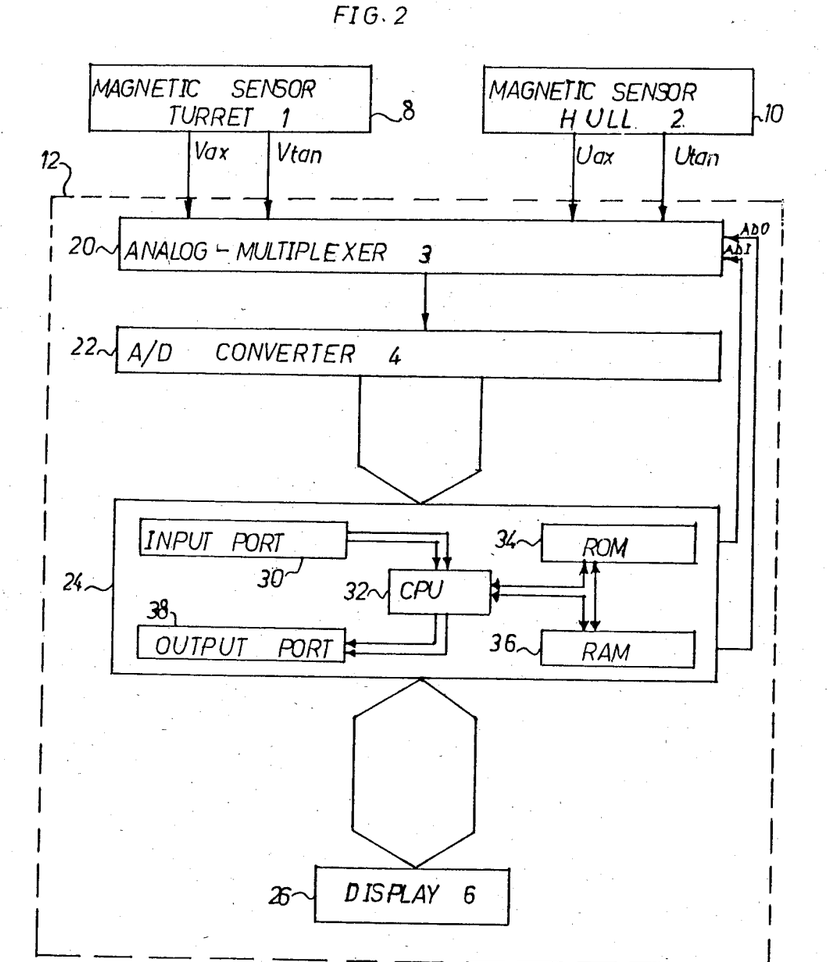
FIG. 2 is a block diagram illustrating the navigation system of FIG. 1.

The block diagram of FIG. 2 schematically illustrates the turret sensor 8, hull sensor 10, and the control and display unit 12. The turret sensor 8 produces an analog output signal ($V_{ax}$) proportional to the longitudinal-axis component of the magnetic flux on the turret 4, and a further analog signal ($V_{tan}$) proportional to the tangential-axis component of the magnetic flux on the turret. Similarly, the hull sensor 10 outputs an analog signal ($U_{ax}$) proportional to the longitudinal-axis component of the magnetic flux on the hull, and a further analog signal ($U_{tan}$) proportional to the tangential-axis component of the magnetic flux on the hull.

The foregoing signals from the sensors 8 and 10 are inputted into the control and display unit 12, which latter unit includes a multiplexer 20, an analog-to-digital converter 22, a microcomputer 24, and a display 26. Thus, the outputs from the two sensors 8 and 10 are sampled by the multiplexer 20 under the control of signals AD0 and AD1 from microcomputer 24, and the selected samples are converted to digital values by the analog-to-digital converter 22 before being inputted into the microcomputer 24. The microcomputer 24 processes this information, particularly in conjunction with previously-stored look-up tables of correction factors for various azimuth positions of the hull 4 and turret 6, and computes the true hull and turret azimuths, which information is displayed in the display 26.

The microcomputer 24 may be a commercially available one, including an input 30 for receiving the inputted information from the analog-to-digital converter 22; a CPU (Central Processor Unit) 32 which controls all the operations of the microcomputer; an ROM (Read Only Memory) 34 in which is stored the look-up tables of correction factors for the various azimuth positions of the tank hull and turret, as well as the program controlling the microcomputer; an RAM (Random Access Memory) 36, in which are stored various data during the computations performed by the microcomputer; and an output 36 for reading out the information to the display unit 26. As mentioned earlier, there are two look-up tables of correction factors stored in the ROM 34, one table to be used in correcting the measured azimuth by the sensor 8, and the other to be used in correcting the measured azimuth by the turret sensor 10. The errors to be corrected are mainly as follows:

(1) errors resulting from the distortion of the components of magnetic flux by the proximity of magnetizable material in the tank's hull 4;

(2) errors resulting from the distortion of the components of magnetic flux by the proximity of magnetizable material in the tank's turret 6;

(3) errors resulting from other extraneous magnetic disturbances, such as start-up of the tank engine or operation of a radar system, which disturbances detract from or augment a component of magnetic flux being measured; and (4) errors resulting from random magnetic noise.

Actually, the look-up tables stored in the ROM 34 correct only for the first two kinds of errors, i.e., errors (1) and (2) above, which errors are "bias" errors. The last two kinds of errors are "noise" errors and are reduced by a digital low-pass filter included in the system, as to be described more particularly below.

With respect to errors (1) and (2) above corrected by the look-up tables stored in the ROM 34, it will be seen that these errors depend not only on the positions of the hull and turret with respect to the Magnetic North, but also on their positions with respect to each other. Accordingly, the two tables of correction factors are each in the form of a rectangular matrix defining all the positions of the hull and turret relative to the Magnetic North. These tables of correction factors are prepared at some time before the tank becomes operational, e.g., at the factory, and are stored in the ROM 34 of microcomputer 24 so that this information will be thereafter available for use when the tank is operational. Since these tables are related to the magnetic-field disturbing characteristics inherent in the construction of the tank, once computed and stored with respect to a particular tank, they need not thereafter be changed.

Main Computer Operations

Figure 3:
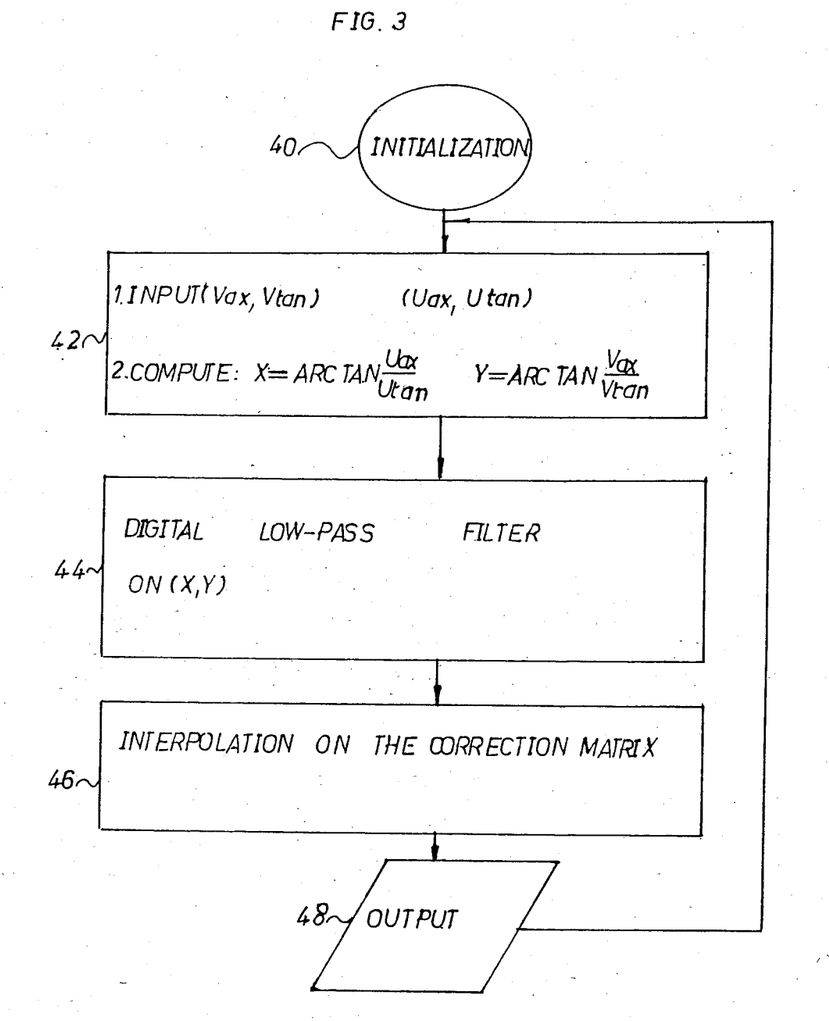
FIG. 3 is a flow diagram broadly illustrating the operations to be performed by the microcomputer.

FIG. 3 illustrates the general flow diagram of the main operations which the microcomputer 24 is programmed to perform for providing true values of azimuth. Thus, after initialization (block 40), the outputs of the turret sensor 8 and hull sensor 10 are inputted (in digital form following converter 22) into the microcomputer 24. The inputted values $V_{ax}$ from the turret sensor $8_x$ and $U_{ax}$ from the hull sensor 10 are proportional to the sine of the heading; and the inputted values $V_{tan}$ and $U_{tan}$ are proportional to the cosine of the heading. A microcomputer 24 computes from the sin/cos values outputted by the sensors, the arc-tangent values, which latter values correspond to the measured azimuth, as illustrated in block 42 and as will be described more particularly below. The so computed arc-tangent (azimuth) values are then passed through a digital low-pass filter (block 44) for purposes of noise reduction, as will also be described more particularly below. Because the look-up tables of correction factors are based on discrete points, the system performs an interpolation operation (block 46) to interpolate or converge to the real azimuth, which values are then outputted (block 48) to the display 26 (FIG. 2) and/or are otherwise used for control purposes.

With respect to block 42, in the flow diagram of FIG. 3, it is assumed that the output from the hull sensor 8 and turret sensor 10 are compensated for roll and pitch; such compensation is provided by commercially available sensors as indicated above. However, if the sensors used are not so compensated, block 42 may include a tilt-compensation procedure involving the transformation of the orthogonal-local components to horizontal and vertical components. Such a transformation is made by multiplying the 3-axes outputs by the Ouler-matrix:

$$\begin{bmatrix} x \\ y \\ z \end{bmatrix} = \begin{bmatrix} l_1 & l_2 & l_3 \\ m_1 & m_2 & m_3 \\ n_1 & n_2 & n_3 \end{bmatrix} \begin{bmatrix} x' \\ y' \\ z' \end{bmatrix}$$

wherein the origins of the x-y-z and x'-y'-z' coordinates are the same and ($l_1$, $m_1$, $n_1$, $l_2$, $m_2$, $n_2$, $l_3$, $m_3$, $n_3$) are the direction-cosines of the x'-y'-z' axes relative to the x-y-z axes respectively. These direction-cosines should be measured by orthogonal accelerometers, inclination sensors, or gyros.

The information inputted by the sensors 8 and 10, which relate to the sin/cosine functions, is used by the microcomputer 24 for computing the arc tangent functions (which relate to the measured azimuth) as follows:

$$X \cong \arctan \frac{V_{ax}}{V_{tan}} \;\; ; \;\; Y \cong \arctan \frac{U_{ax}}{U_{tan}}$$

Placing the computed angles (X, Y) in the right quadrant will be determined by the signs of the analog sensors'-output as follows:

if $U_{ax} > 0$, $U_{tan} > 0$ then $0 < X \leq 90°$ if $U_{ax} > 0$, $U_{tan} < 0$ then $90° < X \leq 180°$ if $U_{ax} < 0$, $U_{tan} < 0$ then $180° < X \leq 270°$ if $U_{ax} < 0$, $U_{tan} > 0$ then $270° < X \leq 360°$ The same rules are valid for Y and ($V_{ax}$, $V_{tan}$) respectively.

The digital low-pass filter operation 44, provided for "noise reduction" as distinguished from "bias reduction" provided by the look-up tables, is described more particularly below.

Figure 4:
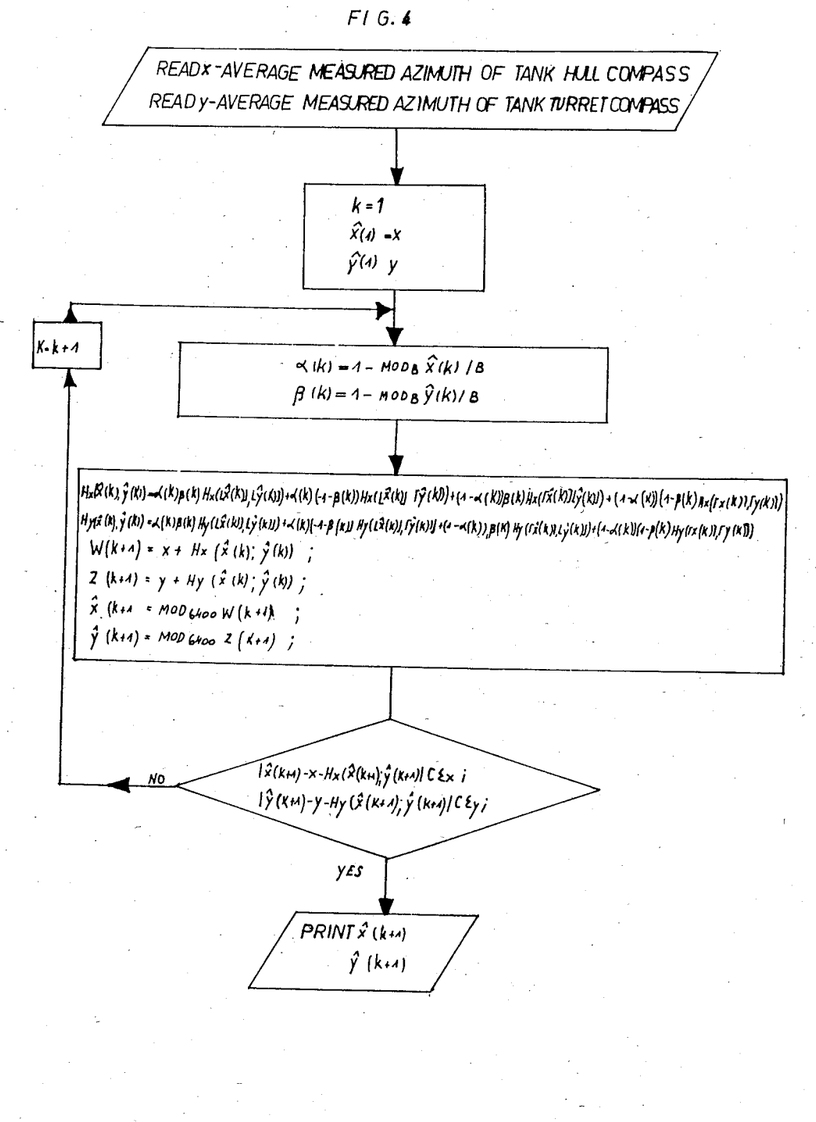
FIG. 4 is a flow diagram illustrating the procedures to be performed by the microcomputer for the interpolation operation of FIG. 3 according to one embodiment of the invention.
Figure 5:
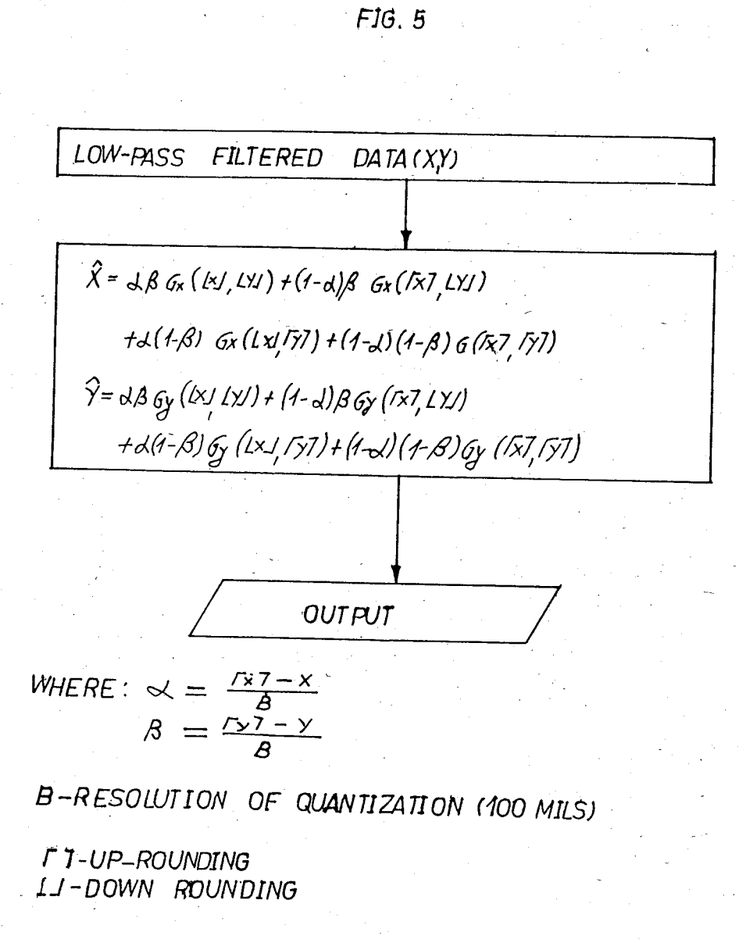
FIG. 5 is a flow diagram illustrating the interpolation operation of FIG. 3 according to a second embodiment of the invention.

Interpolation Algorithms of FIGS. 4 and 5

With respect to the interpolation operation 46 in the flow diagram of FIG. 3, this procedure may be performed according to an iteration algorithm as illustrated in FIG. 4, or according to a non-iteration algorithm as illustrated in FIG. 5, depending upon how the correction factors of the look-up tables stored in the microcomputer ROM 34 are computed.

One way of computing and storing these correction factors is to locate the tank in an area wherein the true azimuth positions with respect to the Magnetic North are known or can be precisely determined. The outputs of the two sensors 8 and 10 are read-out and recorded at all the known true azimuth positions, thereby enabling the correction factors to be determined for each position. The correction factors stored in the look-up tables of the ROM 34 would thereby be based on the true azimuth positions. However, since during the operation of the tank the corrections would be based on the measured azimuth positions, an interpolation procedure would be followed involving iterations converging from the measured azimuth to the real azimuths. Such an iteration interpolation procedure is illustrated in FIG. 4, which procedure solves the following equations:

$$X = \hat{X} - H_x(\hat{X}, \hat{Y}) + n_x \tag{1}$$

$$Y = \hat{Y} - H_y(\hat{X}, \hat{Y}) + n_y \tag{2}$$

The definitions of the variables and other parameters in the flow-chart illustrated in FIG. 4 are as follows:
X = Average computed azimuth of tank-hull sensor;
Y = Average computed azimuth of tank-turret sensor;
$\hat{X}$ = Real (true) tank-hull azimuth;
$\hat{Y}$ = Real tank-turret azimuth;
$\hat{X}(k)$ = Estimated hull-azimuth in k iterations;
$\hat{Y}(k)$ = Estimated turret-azimuth in k iterations;
$H_x(\hat{X}, \hat{Y})$ = Tank-hull-sensor-error in (X, Y) position;
$H_y(\hat{X}, \hat{Y})$ = Tank-turret-sensor-error in (X, Y) position;
$\eta_x$ = Random noise in hull-sensor;
$\eta_y$ = Random noise in turret-sensor;
$E_x$ = Convergence-interval in x-azimuth;
$E_y$ = Convergence-interval in y-azimuth.
K = Iteration number;
$\lceil X \rceil$ = Operator which rounds "X" to the upper nearest discrete point ($X_K$);
$\lfloor X \rfloor$ = Operator which rounds "X" to the lower nearest discrete point ($X_K$).

In this case, the resolution (B) is about 100 milliradians.

When the angle between the turret and the hull is also measured (which is the case in a few tank models), this data may improve the accuracy of the algorithm by adding the equation:

$$Z = \hat{X} - \hat{Y} + \eta_z \tag{3}$$

where: Z is the projection of the hull-turret-angle on the horizontal plane; and $\eta_z$ is the random-noise in the angle-sensor.

An alternative procedure may also be used for preparing the look-up tables of the correction factors stored in the microcomputer ROM 34, which alternative procedure would not require iterations converging from the measured azimuth to the true azimuth. In this alternative procedure, the measured experimental results may be computed off-line and based on the measured azimuth positions, rather than on the true azimuth positions. This alternative procedure is illustrated in FIG. 5 and solves the following equations:

$$\hat{X} \approx X + G_X^A(X, Y) \quad (4)$$

$$\hat{Y} \approx Y + G_Y^A(X, Y) \quad (5)$$

where:

$G_X^A$ (X, Y)—a correction term in the measured position (X, Y) to the tank-hull azimuth;

$G_Y^A$ (X, Y)—a correction term in the measured position (X, Y) to the tank-turret azimuth.

In this alternative procedure, the algorithm illustrated in FIG. 5 is merely a simple solution of Equations (4) and (5) above, and where "Z" (i.e., the angle between the turret and the hull) is available, also Equation (3) above.

The "measured" hull and turret azimuths (X, Y) are computed easily according to this algorithm:

$$X = \text{arc tan} \frac{U_{ax}}{U_{tan}} \text{ if } U_{ax} < U_{tan} \quad (6)$$

$$\text{arc cotan} \frac{U_{tan}}{U_{ax}} \text{ if } U_{ax} > U_{tan}$$

where $U_{ax}$, $U_{tan}$ are voltages relative to the orthogonal-horizontal-components of the local-magnetic flux. Such a procedure assures no division by "zero."

While the alternative procedure illustrated in FIG. 5 does not require iterations converging to the true azimuth positions, nevertheless, iterations may still be used, and in some cases may even be desirable.

The "real values" (X, Y) can also be computed by other known techniques, for example by the bi-linear interpolation between the four nearest neighbours.

Digital Low-Pass Filter Procedure

As indicated earlier, a digital low-pass filter procedure (block 44 in FIG. 3) may be implemented by a software block stored in the microcomputer ROM 24 during the real-time data processing. This filter procedure makes use of the fact that the informational data which is to be processed (namely the azimuth positions), are narrow-band signals with spectral density lower than 0.1 Hz.

Therefore by averaging and eliminating instantaneous changes in azimuth, the noise and disturbance effects may be reduced.

For example, if after a sequence of computed azimuths, there is a "change" of more than a reasonable range, this data is defined as "disturbance" and neglected. The other acceptable data is averaged to reduce the noise effects. Another possibility is using the "Wiener Filter":

$$H_{opt} = \left[ \frac{S_{az}(f)}{S_{az} + S_{nn}} \right] \perp$$

Variations and Other Applications

As indicated earlier, the described system is particularly useful for navigating tanks which include two relatively movable parts having individual and mutual magnetic-field disturbing characteristics. Among the many other advantages provided by such a system, as described in the earlier part of the specification, there may also be added the further advantage that the system provides heading data for the azimuth of both relatively movable parts, i.e., the turret and the hull of the tank. This is particularly advantageous when the system is used in a tank, since the hull azimuth is important for navigation and the turret azimuth is important for target identification and fire control. The system, however, could advantageously be used in other applications, for example with respect to field artillery pieces, ships, and aircraft, wherein it may be desired or required to provide two headings, one for navigation and the other for target identification and fire control.

The novel system could also be used for providing only one form of heading information, such as in a small armored vehicle. It will be appreciated that when the system is used for providing only a single heading, the table of correction factors stored in the microcomputer ROM would be in the form of a single-dimension vector, rather than in the form of two-dimensional matrices, as in the described embodiment involving the computation of two headings. The solution of a single-heading application, however, would be similar as described above, except that the solution would involve a one-dimensional procedure rather than a two-dimensional procedure.

Many microcomputers are commercially available and capable, according to known programming procedures, of performing the operations described above. For purposes of example, there may be mentioned the Intel 8086 and the Motorola 68000. Further details of the construction and program of the microcomputer 24 are therefore not necessary herein.

While the invention has been described with respect to an embodiment for use with a tank, it will be appreciated that many other variations, modifications, and applications of the invention may be made.

What is claimed is:

1. A navigation system particularly useful for a vehicle including two relatively movable parts having individual and mutual magnetic-field disturbing characteristics inherent in its construction, comprising:

two magnetic-field sensors each mounted on one of said parts of the vehicle and outputting electrical signals corresponding to the measured azimuth of the two parts of the vehicle;

an analog-to-digital converter for converting said output signals to digital values;

and a microcomputer including a storage device having stored therein two look-up tables, each in the form of a matrix of correction factors for the various azimuth positions of each relatively movable part of the vehicle; input means for inputting the digital values corresponding to the measured azimuth of the two parts of the vehicle; computer means programmed to compute from the measured values and said stored look-up tables the true azimuth values; and output means for outputting said true azimuth values.

2. The navigation system according to claim 1, wherein said microcomputer storage device look-up tables have stored therein the correction factors based on various true azimuth positions of each of the two relatively movable parts of the vehicle; said computer means being programmed to compute, by interpolation of said stored correction factors, the true azimuth values of each of the two vehicle parts according to an iterative algorithm which converges from the measured azimuth to the true azimuth.

3. The navigation system according to claim 1, wherein said matrices of correction factors stored in said look-up tables are based on the measured azimuth positions of the two relatively movable parts of the vehicle; said computer means being programmed to compute the true azimuth values of the two vehicle parts by direct interpolation of said stored correction factors.

4. The navigation system according to claim 1, further including filter means for removing from the electrical signals outputted by each sensor the higher frequency components having a frequency higher than about 0.1 Hz.

5. A navigation system particularly useful for a vehicle, such as a tank, including two relatively movable parts having individual and mutual magnetic-field disturbing characteristics inherent in its construction, comprising:
two magnetic-field sensors each mounted on one of said parts of the vehicle and outputting electrical signals corresponding to the measured azimuth of the two parts of the vehicle;
filter means for removing from the electrical signals outputted by each sensor the higher frequency components having a frequency higher than about 0.1 Hz;
an analog-to-digital converter for converting said filtered output signals to digital values;
and a storage device having stored therein two look-up tables each in the form of a matrix of correction factors for the various azimuth positions of each relatively movable part of the vehicle;
input means for inputting the digital values corresponding to the measured azimuth of the two parts of the vehicle;
computer means programmed to compute from the measured values and said stored look-up tables the true azimuth values; and
output means for outputting said true azimuth values.

6. The navigation system according to claim 5, wherein said look-up tables have stored therein the correction factors based on various true azimuth positions of each of the two relatively movable parts of the vehicle; said computer means being programmed to compute, by interpolation of said stored correction factors, the true azimuth values of each of the two vehicle parts according to an iterative algorithm which converges from the measured azimuth to the true azimuth.

7. The navigation system according to claim 5, wherein said look-up tables have stored therein the correction factors based on the measured azimuth positions of the two relatively movable parts of the vehicle; said computer means being programmed to compute the true azimuth values of the two vehicle parts by direct interpolation of said stored correction factors.

* * * * *